United States Patent
Chandran

(10) Patent No.: US 7,569,086 B2
(45) Date of Patent: Aug. 4, 2009

(54) FLUID BED REACTOR HAVING VERTICALLY SPACED APART CLUSTERS OF HEATING CONDUITS

(75) Inventor: Ravi Chandran, Ellicott City, MD (US)

(73) Assignee: ThermoChem Recovery International, Inc., Baltimore, MD (US)

( * ) Notice: Subject to any disclaimer, the term of this patent is extended or adjusted under 35 U.S.C. 154(b) by 328 days.

(21) Appl. No.: 11/409,837

(22) Filed: Apr. 24, 2006

(65) Prior Publication Data
US 2007/0245627 A1    Oct. 25, 2007

(51) Int. Cl.
*B01J 7/00* (2006.01)
*H01M 8/06* (2006.01)
*C01B 3/36* (2006.01)
*C10J 3/46* (2006.01)
*C10J 3/54* (2006.01)
*F28D 13/00* (2006.01)
*B01J 8/18* (2006.01)
*F27B 15/00* (2006.01)
*F27B 15/14* (2006.01)
*F27B 15/16* (2006.01)

(52) U.S. Cl. .................. 48/197 R; 48/61; 165/104.16; 422/139; 422/146

(58) Field of Classification Search ............... 48/197 R, 48/61; 165/104.16; 422/139, 146
See application file for complete search history.

(56) References Cited

U.S. PATENT DOCUMENTS 2,800,307 A    7/1957    Putney
4,688,521 A *  8/1987    Korenberg ............... 122/4 D
5,059,404 A    10/1991   Mansour et al.
5,064,444 A *  11/1991   Kubiak et al. ............. 48/202
5,133,297 A    7/1992    Mansour
5,197,399 A    3/1993    Mansour
5,205,728 A    4/1993    Mansour
5,211,704 A    5/1993    Mansour
5,255,634 A    10/1993   Mansour
5,306,481 A    4/1994    Mansour et al.

(Continued)

OTHER PUBLICATIONS

International Search Report No. PCT/US2007/067095, dated Jul. 1, 2008.

(Continued)

*Primary Examiner*—Alexa D Neckel
*Assistant Examiner*—Matthew J Merkling
(74) *Attorney, Agent, or Firm*—Womble Carlyle

(57) ABSTRACT

A fluid bed reactor is configured to process a reactive material to form one or more products. The reactor includes a reaction vessel defining a compartment configured to receive the reactive material. A first cluster of heating conduits at least partially occupies the compartment and extends over a first vertical extent within the compartment. A second cluster of heating conduits partially occupies the compartment and extends over a second vertical extent within the compartment. The first cluster of heating conduits is vertically below the second cluster of heating conduits and spaced apart therefrom by a first separation distance. Feedstock inlets are configured to introduce the reactive material into a region that is vertically between the first and second clusters of heating conduits. The heating conduits in the first cluster have a first thickness while the heating conduits in the second cluster have a second thickness. The first separation distance is at least as great as the smaller of the first and second thicknesses.

12 Claims, 4 Drawing Sheets

U.S. PATENT DOCUMENTS

| | | |
|---|---|---|
| 5,353,721 A | 10/1994 | Mansour et al. |
| 5,366,371 A | 11/1994 | Mansour et al. |
| 5,536,488 A | 7/1996 | Mansour et al. |
| 5,637,192 A | 6/1997 | Mansour et al. |
| 5,638,609 A | 6/1997 | Chandran et al. |
| 5,842,289 A | 12/1998 | Chandran et al. |
| 6,149,765 A | 11/2000 | Mansour et al. |
| 6,548,197 B1 | 4/2003 | Chandran et al. |
| 6,832,565 B2 | 12/2004 | Chandran et al. |
| 6,923,004 B2 | 8/2005 | Chandran et al. |
| 6,958,136 B2 | 10/2005 | Chandran et al. |
| 6,997,118 B2 | 2/2006 | Chandran et al. |

OTHER PUBLICATIONS

Written Opinion of the International Searching Authority, mailed Aug. 6, 2008, 6 pgs.

International Preliminary Report on Patentability from PCT/US2007/067095, issued Oct. 28, 2008.

\* cited by examiner

US 7,569,086 B2

FLUID BED REACTOR HAVING VERTICALLY SPACED APART CLUSTERS OF HEATING CONDUITS

FIELD OF THE INVENTION

The present invention relates to a fluid bed reactor for processing a reactive material, which may include inorganic materials, and also carbonaceous materials, such as black liquor and biomass, to process and/or recycle materials and extract energy. More particularly, the present invention concerns such a reactor having two or more spaced apart clusters of heating conduits configured to indirectly heat the fluid bed and materials therein.

BACKGROUND OF THE INVENTION

FIGS. 1A and 1B show top and side views, respectively, of a prior art reactor, configured as a cylindrical reformer 100. The cylindrical reformer 100 includes a cylindrical compartment 101 forming a reaction vessel. The reformer 100 comprises one or more pulse heaters 102A, 102B, each of which comprises a pulse combustor 104A, 104B connected to a respective resonance tube 106A, 106B. As seen in FIG. 1A, the pulse heaters 102A, 102B extend in one direction across the diameter of the cylinder. Air and fuel products enter the pulse combustors 104A, 104B and the combustion products or flue gas exit the resonance tubes 106A, 106B.

The pulse heaters 102A, 102B are of the sort disclosed in U.S. Pat. No. 5,059,404, whose contents are incorporated by reference to the extent necessary to understand the present invention. Such pulse heaters are configured to indirectly heat fluids and solids introduced into a reformer reaction vessel 101. The resonance tubes 106A, 106B associated with the pulse heaters 102A, 102B serve as heating conduits for indirectly heating contents of the compartment 101.

As seen in FIGS. 1A and 1B, a second pair of pulse heaters 108A, 108B are directed at right angles to the first pair of pulse heaters 102A, 102B across the diameter of the compartment. As seen in FIG. 1B, this leaves vertically extending quadrants 136 within the compartment 101 in regions defined by the crossing pulse heaters.

The pulse heaters are immersed in a dense fluid bed 110, which extends from the compartment bottom 112 to approximately the top bed line 114. The bottommost pulse heater 102B is located at a height H1 meters above the distributor 122 to avoid painting the resonance tubes 104B with liquor 118. In some prior art systems, the height H1 is about 2-3 meters.

Spent liquor 118 is injected into the side of the compartment 101 near the bottom of the dense fluid bed 110. Generally speaking, the spent liquor is introduced into the compartment via a plurality of inlets 103 that are circumferentially arranged around the cylindrical compartment 101. Though in FIG. 1B, only four such inlets 103 are shown, it is understood that other numbers of circumferentially arranged inlets may be provided. In other prior art embodiments, the spent liquor may be introduced through the bottom of the compartment 101 through a plurality of inlets more or less evenly distributed across the bottom, perhaps arranged in an array or other pattern.

Superheated steam 120, or other fluidization medium, enters from the bottom of the compartment 101 and passes through a distributor 122. The distributor 122 helps uniformly spread the entering steam 120, which then percolates through the dense fluid bed 110. Product gas 124 leaves from a freeboard area 126 at the top of the compartment 101 after passing through one or more internal cyclones (not shown) used to help drop out entrained bed solids.

FIGS. 2A and 2B show an alternative prior art configuration in the form of a rectangular reformer 200. The rectangular reformer 200 has a compartment 201 with a rectangular cross-section as seen from above (See FIG. 2B). A plurality of pulse heaters 102 arranged in one or more rows pass through this compartment 201. The rows are staggered relative to each other to enhance heat transfer. Each of these pulse heaters 102 comprises a heating conduit in the form of a resonance tube for indirectly heating the contents of the compartment 201.

A distributor 222 is provided at the bottom of the compartment 201, much like in the cylindrical reformer 100. The bottommost pulse heaters 202 are located at a height H2 above the distributor 222. In some prior art systems, this height H2 is again about 2-3 meters. Moreover, just as in the case with the cylindrical reformer, spent liquor 218 is introduced into the side of the compartment 201 near its bottom. Generally speaking, the spent liquor is introduced into the compartment via a plurality of inlets 203 that are arranged along the walls around the rectangular compartment 201. In other prior art embodiments, the spent liquor may be introduced through the bottom of the compartment 201 through a plurality of inlets more or less evenly distributed across the bottom, perhaps arranged in an array or other pattern. Meanwhile, product gas 224 leaves from a freeboard area 226 at the top of the compartment 201. It is understood that the operation of the rectangular reformer 200 is similar to that of the cylindrical reformer 100 described above, in most material respects.

Upon injection into the fluid bed 110, the carbonaceous feedstock undergoes drying, devolatilization, char formation and char conversion. In a steam reforming environment, all of these processes are endothermic i.e. require heat input. An issue in the prior art configuration is that drying, devolatilization, char formation and char conversion processes all compete for heat transfer and mass transfer in the region that is above the distributor but below the bottom pulse heater. All these processes are heat sinks and the entering fluidization medium 120 may be another heat sink if it is steam and is at a temperature below that of the fluid bed. The only heat sources are the pulse heaters and these are significantly removed from the heat sinks by the aforementioned distances H1 and H2 in the prior art embodiments described above. The only link is the solids circulation rate and if this is not up to par, the feedstock injection region starves for heat and the reactor performance suffers.

In addition, both heat transfer and mass transfer are important for satisfactory char conversion. The higher the char temperature and the reactant or steam concentration, the greater the char conversion rate. The region just above the distributor 122, 222 is characterized by high steam or reactant concentration, which is favorable for char conversion, provided the char temperature could be maintained at the fluid bed temperature. Due to feedstock injection and reduced solids circulation rate, the heat supply is limited which is likely to depress the char temperature and in turn the char conversion rate. In the region of the pulse heaters, the heat transfer is good but the mass transfer may be unsatisfactory if the reactant (steam) bypasses due to channeling, again impairing char conversion.

Commercial units generally require deep or tall dense fluidized beds to accommodate the large number of heat transfer tubes. Operating these units in bubbling fluidization regime is rather limiting from heat and mass transfer and gas/solid contact standpoints due to the relatively large bubbles, increased bubble coalescence and the propensity for steam/ gas bypassing. Conversely, operation in the turbulent fluidization regime affords good gas/solid contact and excellent heat and mass transfer characteristics. This, however, requires a significantly higher superficial fluidization velocity than that for the bubbling regime. One feasible approach is to select a different heat exchanger configuration and a smaller bed material mean particle size.

SUMMARY OF THE INVENTION

In one aspect, the present invention is directed to a fluid bed reformer for converting a carbonaceous material into a product gas. The fluid bed reformer comprises a reaction vessel defining a compartment suitable for receiving carbonaceous material. A first cluster of heating conduits at least partially occupies the compartment and extends over a first vertical extent within the compartment. Each heating conduit in the first cluster is configured to transfer heat from a heat source to the compartment, the heating conduits in the first cluster having a first thickness. A second cluster of heating conduits at least partially occupies the compartment and extends over a second vertical extent within the compartment. Each heating conduit in the second cluster is configured to transfer heat from a heat source to the compartment, the heating conduits in the second cluster having a second thickness. The second cluster of heating conduits is positioned vertically above the first cluster of heating conduits and spaced apart therefrom by a first separation distance, the first separation distance being at least as large as the smaller of the first and second thicknesses. A plurality of feedstock inlets are configured to introduce carbonaceous material into the reaction vessel in a region that is vertically between the first and second clusters of heating conduits.

In another aspect, the present invention is directed to a method of converting a carbonaceous material into a product gas. The method begins with providing a reaction vessel having the first and second clusters of heating conduits as described immediately above, introducing a fluidization medium into the compartment, introducing carbonaceous material into the compartment in a region that is vertically between the first and second clusters of heating conduits; and then controlling a reaction in the reaction vessel such that at least a portion of the carbonaceous material is converted into a product gas in a fluidized bed.

In yet another aspect, the present invention is directed to a fluid bed reactor configured to thermochemically or biochemically process a reactive material. The reactor comprises a reaction vessel defining a compartment suitable for receiving a reactive material. A first cluster of heating conduits at least partially occupies the compartment and extends over a first vertical extent within the compartment. Each heating conduit in the first cluster is configured to transfer heat from a heat source to the compartment, the heating conduits in the first cluster having a first thickness. A second cluster of heating conduits at least partially occupies the compartment and extends over a second vertical extent within the compartment. Each heating conduit in the second cluster is configured to transfer heat from a heat source to the compartment, the heating conduits in the second cluster having a second thickness, the second cluster of heating conduits being positioned vertically above the first cluster of heating conduits and spaced apart therefrom by a first separation distance, the first separation distance being at least as large as the smaller of the first and second thicknesses. A plurality of feedstock inlets are configured to introduce a reactive material into the reaction vessel in a region that is vertically between the first and second clusters of heating conduits.

In still another aspect, the present invention is directed to a method of thermochemically or biochemically processing a reactive material to form a product. The method begins with providing a fluid bed reactor including a reaction vessel defining a compartment suitable for receiving a reactive material, a first cluster of heating conduits and a second cluster of heating conduits, as described above. The method continues with introducing a fluidization medium into the compartment, introducing reactive material into the compartment in a region that is vertically between the first and second clusters of heating conduits; and then controlling a reaction in the reaction vessel such that at least a portion of the reactive material is converted into one or more products in a fluidized bed.

BRIEF DESCRIPTION OF THE DRAWINGS

For a better understanding of the present invention and to show how the same may be carried out in practice, reference will now be made to the accompanying drawings, in which.

DETAILED DESCRIPTION OF PREFERRED EMBODIMENTS

The contents of U.S. Pat. Nos. 5,059,404; 5,306,481; 5,353,721; 5,536,488; 5,637,192 and 6,149,765 are incorporated by reference to the extent necessary to understand the present invention.

Figure 3A:
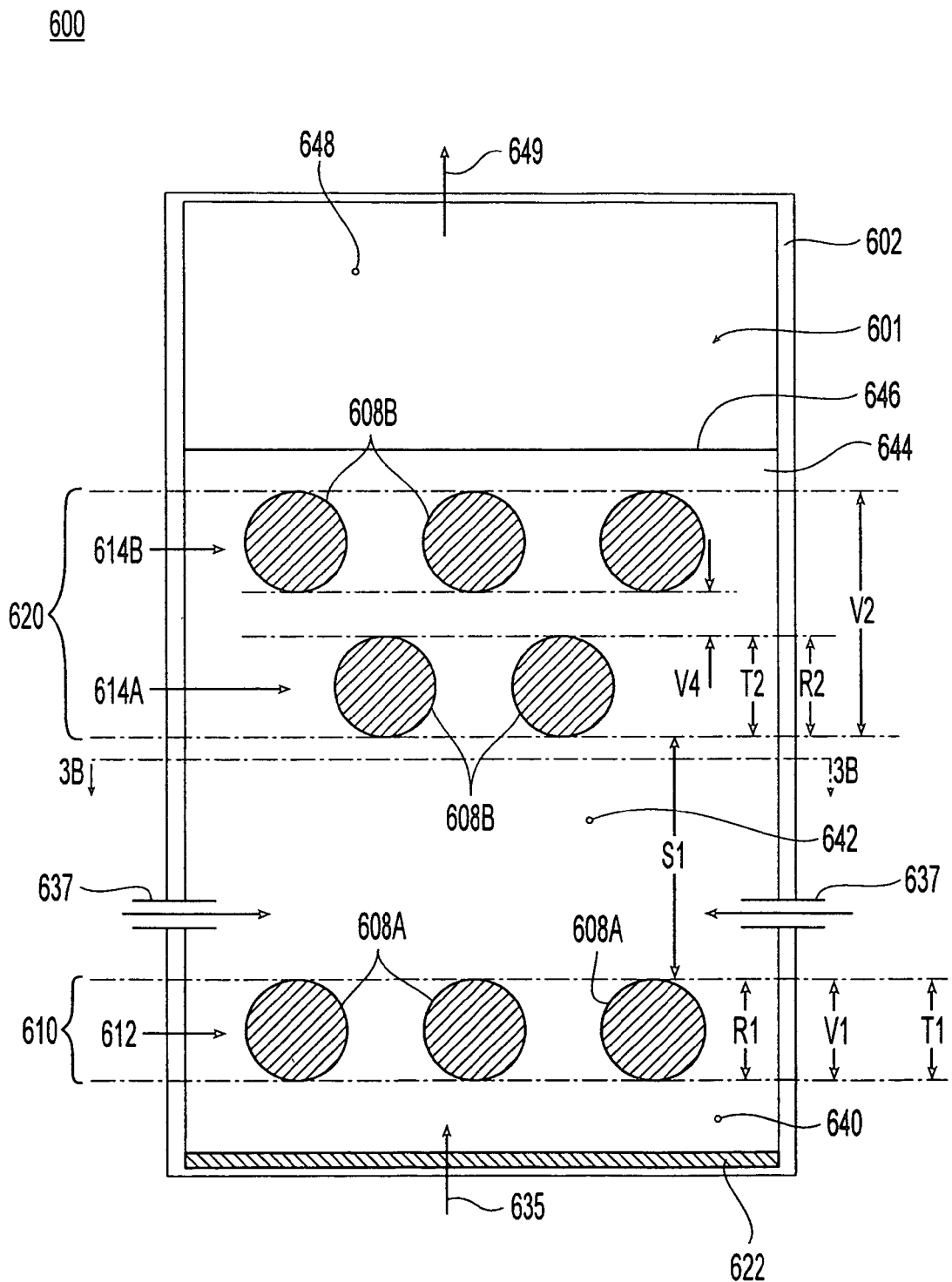
FIG. 3A shows a side view of a reactor in accordance with the present invention.
Figure 3B:
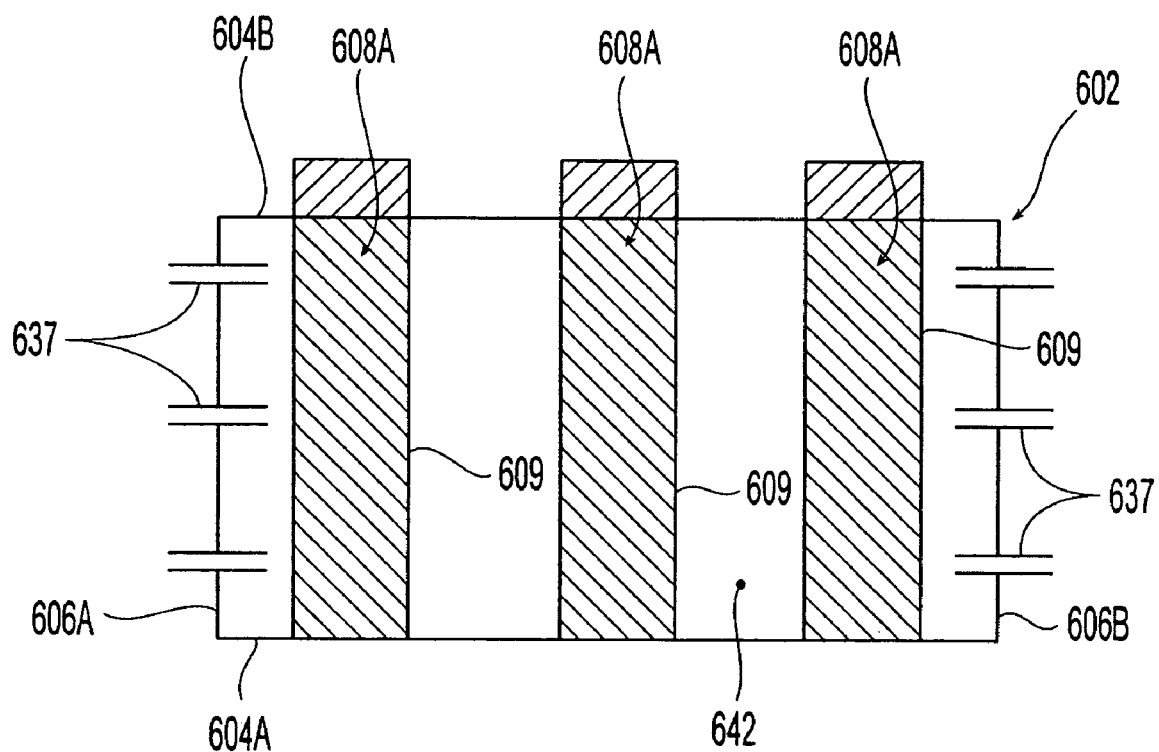
FIG. 3B shows a top cross-sectional view of the reactor of FIG. 3A taken along lines 3B-3B.

FIGS. 3A and 3B show views of a fluid bed reformer 600 comprising a compartment 601 serving as a reaction vessel 602. As best seen in FIG. 3B, the reaction vessel 602 has a rectangular footprint (i.e., a rectangular shape in a horizontal cross-section) comprising two long sides 604A, 604B and two short sides 606A, 606B. A plurality of pulse heaters 608A, 608B pass through the long sides 604A, 604B of the reformer vessel 600. In one embodiment, the pulse heaters 608A, 608B are of a sort well known to those skilled in the art, such as those disclosed in U.S. Pat. No. 5,059,404, mentioned above. The resonance tubes 609 associated with these pulse heaters 608A, 608B serve as heating conduits for indirectly heating contents of the compartment 601.

The pulse heaters 608A, 608B are organized into two vertically spaced-apart clusters, a first, or lower, cluster 610 and a second, or upper, cluster 620. In the embodiment shown, each cluster 610, 620 comprises one or more rows of pulse heaters. It is understood, however, that the pulse heaters within a cluster are not required to be arranged in rows, to be in accordance with the present invention.

As seen in the embodiment of FIG. 3A, the pulse heaters 608A belonging to the lower cluster 610 are arranged in a single, horizontal row 612. Since it is the only row, row 612 serves as both the uppermost row 612 and as the lowermost row 612 of lower cluster 610. The vertical extent V1 of the lower cluster 610 is therefore commensurate with the row height R1. In this instance, the row height R1 corresponds to the thickness T1 of a pulse heater 608A belonging to this row 612 (or, more precisely, the thickness T1 of a heating conduit 609 associated with the pulse heater 608A). Therefore, in the case of a cylindrical heating conduit that is arranged horizontally, R1 is simply the heating conduit diameter. While three pulse heaters are shown in this row 612, it is understood that a row may have a different number of pulse heaters instead.

The pulse heaters 608B belonging to the upper cluster 620 are arranged in a pair of horizontal rows 614A, 614B. In the embodiment shown, the rows 614A, 614B of the upper cluster 620 are staggered relative to one another and are vertically spaced apart from each other by an intra-row spacing of V4. The upper cluster 620 has a vertical extent V2 which is greater than the vertical extent of V1 of the lower cluster 610, due to the presence of two rows 614A, 614B in upper cluster 620, rather than the single row 612 in the lower cluster 610. The lowermost row 614A of the second cluster 602 has a row height R2 which, in the embodiment shown, corresponds to the thickness T2 of the heating conduit associated with the corresponding pulse heaters 608B. When the same types of heating conduits/pulse heaters are used in both clusters 610, 620, the row height R2 of lowermost row 614A of the upper cluster 620 is the same as the row height R1 of the uppermost row 612 of the lower cluster 610.

As seen in FIG. 3A, the first and second clusters 610, 620 are spaced apart by an inter-cluster vertical spacing S1.

In one embodiment, the clusters 610, 620 are spaced sufficiently far apart so that the vertical spacing S1 is at least as large as the smaller of the heating conduit thicknesses T1 and T2. When heating conduits in a given cluster have differing thicknesses, then the average heating conduit thickness for that cluster is used as the 'heating conduit thickness' for purpose of determining the minimum vertical spacing S1.

In other embodiments, the vertical spacing S1 is at least as large as the smaller of the two vertical extents V1, V2 (i.e., $S1 \geq min(V1, V2)$).

In still other embodiments, the vertical spacing S1 is at least twice as large as the smaller of the two vertical extents V1, V2 (i.e., $S1 \geq 2* min(V1, V2)$).

In the foregoing description of the clusters 610, 620, the pulse heaters 608A, 608B in each cluster were arranged in horizontal rows, and so the row heights R1, R2 were the same as the heating conduit thicknesses T1, T2. It is understood, however, that in other embodiments, the pulse heaters may not be arranged in horizontal rows, but instead may be tilted, or angled, from one wall 604A to the opposite wall 604B. In such case, the row heights would not be the same as the heating conduit thicknesses. It is understood that in still other embodiments, the pulse heaters may not even be arranged in rows at all. In all of these instances, however, the vertical spacing S1 would still be at least as large as the smaller of the heating conduit thicknesses T1 and T2.

Also, while the first and second clusters 610, 620, respectively, are shown to have an unequal number of rows, it is understood that in some embodiments the two clusters may have an equal numbers of rows, and that this equal number may be 1, 2, 3, or even more. It is further understood that while in the embodiment of FIGS. 3A-3C, the rows 614A, 614B of the second cluster 620 have unequal numbers of pulse heaters 608B, adjacent rows within a cluster may instead have equal numbers of pulse heaters 608B. Thus, for example, rows 614A, 614B of second cluster 620 may each have three pulse heaters 608B, the rows still being staggered relative to one another.

The total number of rows and the total number of pulse heaters 608A, 608B in each row can be modified in any given design to suit the size, feedstock type and feedstock throughput of the steam reformer 600.

At the bottom of the reformer vessel 602 is a distributor 622 into which a fluidization medium 635, such as steam, is introduced. Just above the distributor 622 and below the first cluster 610 is an enhanced char conversion zone 640. The zone 640 provides for good heat and mass transfer and high reactant (steam) concentration and facilitates enhanced char conversion. The vertical extent of this zone 640 will depend upon the char reactivity and the reformer operating conditions with the slower the reaction(s) the greater the vertical extent.

Between the first cluster 610 and the second cluster 620 is a drying and devolatilization zone 642 with height S1, as previously discussed. This zone is conducive to good solids circulation, heat transport and gas-solid contact and serves to maximize drying and devolatilization and minimize tar and char formation. In one embodiment, feedstock inlets, shown generally as 637, terminate in a region that is vertically between the two clusters 610, 620. Thus, in this embodiment, feedstock is injected into zone 642, which is separated from the primary char reaction zone 640, at a position vertically above the first cluster of pulse heaters and vertically below the second cluster 620 of pulse heaters. It is understood that the feedstock inlets 637 are approximately at the same height and spaced apart along the short sides 606A, 606B of the reformer vessel 602.

Finally, in the region just above the second cluster 620 is a dense bed region 644, which extends to the top bed line 646. A freeboard region 648 occupies the topmost portion of the reformer vessel 602. Product gas 649 exits from the freeboard region 648 via cyclones and other equipment (not shown) known to those skilled in the art.

It is understood that the pulse heaters 608A, 608B of the fluid reformer 600 are under computer control (not shown) so as to vary the firing rate and heat transfer rate to better match the load in the fluid reformer 600 and also enhance reformer turndown.

Figure 1A:
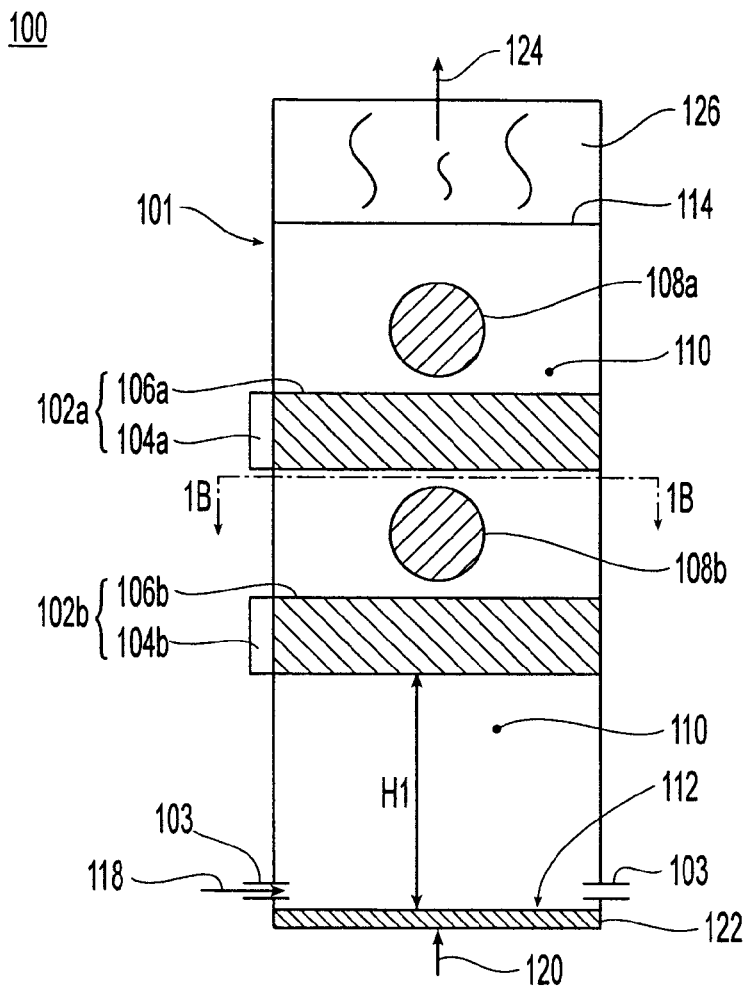
FIGS. 1A and 1B show side and top views, respectively, of a prior art cylindrical reformer.
Figure 1B:
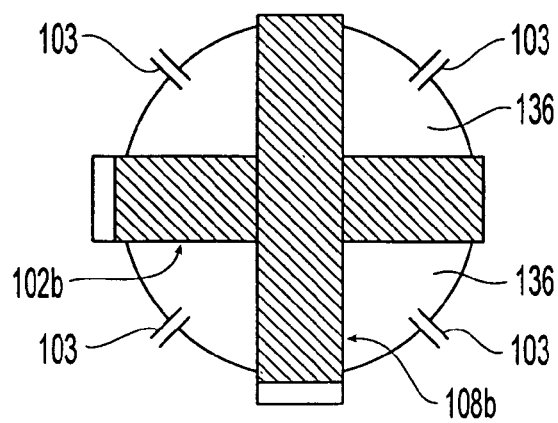
Figure 2A:
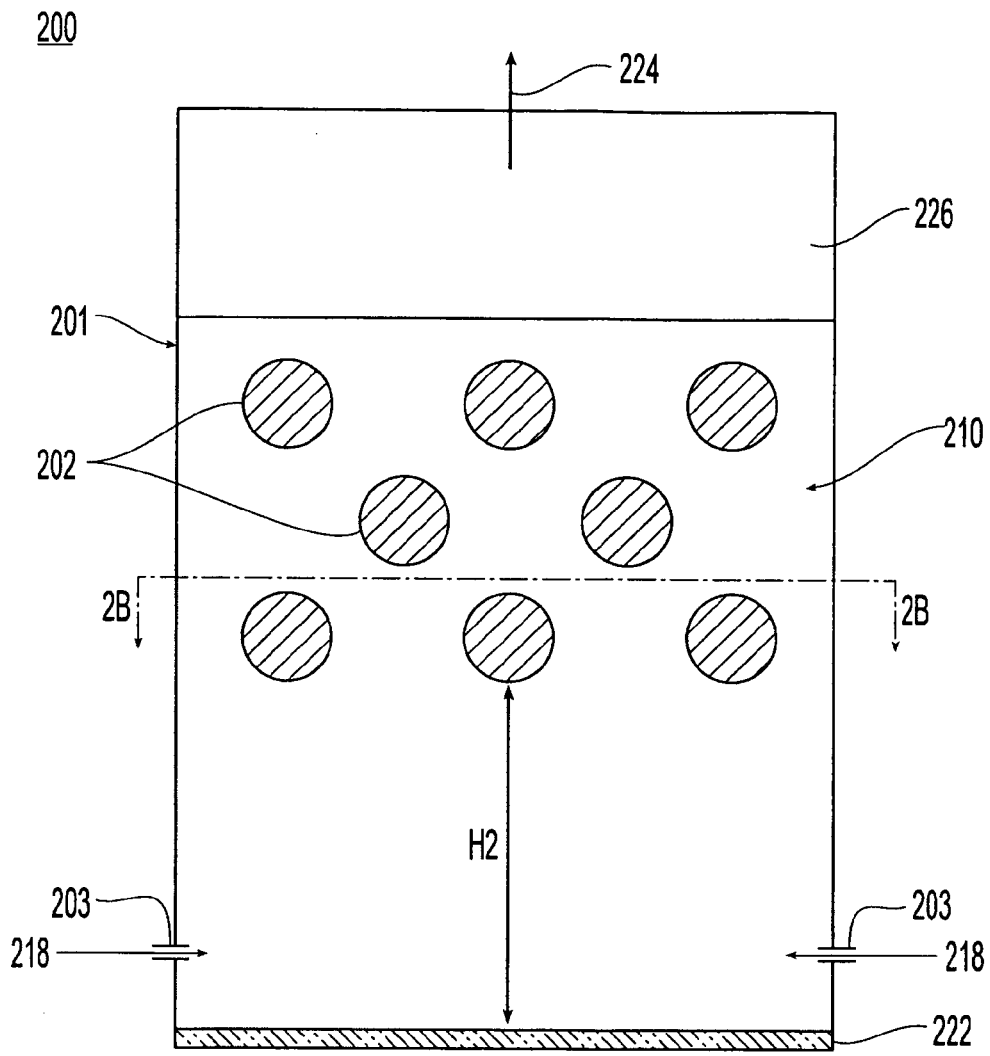
FIGS. 2A and 2B show side and top views, respectively, of a prior art rectangular reformer.
Figure 2B:
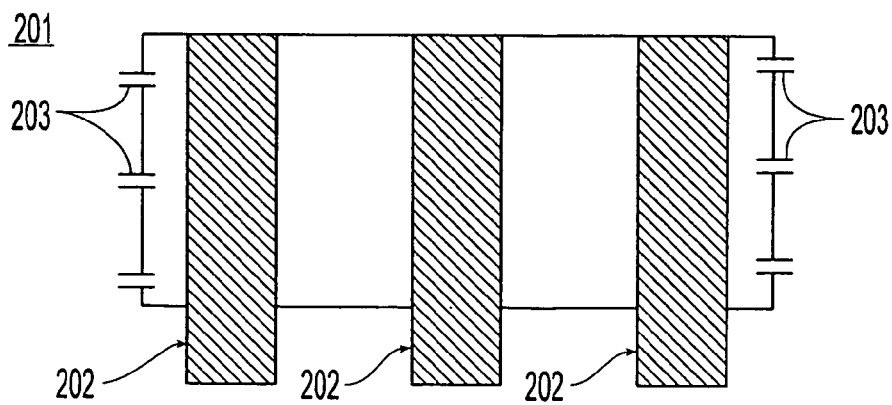

It can be seen from the foregoing that in many respects, the fluid reformer 600 of FIGS. 3A and 3B is similar to the prior art fluid reformer 200 seen in FIG. 2. One principal difference, however, is that the pulse heaters 608A, 608B in fluid reformer 600 are arranged into spaced apart clusters 610, 620, whereas the pulse heaters in the prior art fluid reformer 200 all belong to a single cluster. A second difference is that, in some embodiments, the feedstock is introduced into the compartment 602 in a region that is above the lowest pulse heaters and, in one embodiment, is introduced in a region that is between the two clusters 610, 620.

Operation of the fluid bed reformer to create a product gas from a carbonaceous material begins with an apparatus of the sort described above. This is followed by introducing a fluidization medium in the compartment, introducing a carbonaceous material into the compartment in a region that is vertically between the first and second clusters, and then controlling a reaction in the reaction vessel such that at least a portion of the carbonaceous material is converted into a product gas in a fluidized bed.

People of ordinary skill in the art are familiar with various aspects of controlling the reaction, such as reactant flows, temperature and pressure monitoring, and the like. In those situations where pulse heaters are used, such control entails operation of the pulse heaters, including adjusting their firing rate, air-fuel mix, and other parameters. The reformer may be configured to operate in a turbulent fluidization regime, and the fluidization medium may consist of one from the group of steam, air, enriched air, oxygen, nitrogen, carbon dioxide, recycle product gas, and mixtures thereof.

While the above description contemplates a fluidized bed reformer having a rectangular footprint, it is possible to implement the present invention in reformers having other shapes, as well. Thus, for example, a reformer with a square footprint or a cylindrical footprint may benefit from the present invention, so long as sufficient vertical spacing between the pulse heaters and inlets are provided to introduce the feedstock into this region between clusters of pulse heaters.

Also, while the description above relates to energy conversion and syngas production, it is understood that the reactor may also be gainfully employed for thermochemical or biochemical processing of any reactive material, carbonaceous or otherwise. Thus, it is contemplated that reactive materials such as inorganics may also be processed in such a fluid bed reactor to form one or more desired products.

In addition, the description above was couched in terms of using pulse heaters as the source of indirect heat provided by the heating conduits. It is understood, however, that the above-described reactor may employ sources other than pulse heaters to produce the heat that is indirectly supplied via the heating conduits 609. Examples of such other sources include electric heaters within the heating conduits, fire tubes, and the like.

The above description of various embodiments of the invention is intended to describe and illustrate various aspects of the invention, and is not intended to limit the invention thereto. Persons of ordinary skill in the art will understand that certain modifications may be made to the described embodiments without departing from the invention. All such modifications are intended to be within the scope of the appended claims.

What is claimed is:

1. A method of converting a carbonaceous material into a product gas, the method comprising:

providing a fluid bed reformer comprising:

a reaction vessel defining a compartment suitable for receiving carbonaceous material;

a first cluster of heating conduits at least partially occupying said compartment and extending over a first vertical extent within the compartment, each heating conduit in the first cluster configured to transfer heat from a heat source to the compartment, the heating conduits in the first cluster having a first thickness; and a second cluster of beating conduits at least partially occupying said compartment and extending over a second vertical extent within the compartment, each heating conduit in the second cluster configured to transfer heat from a heat source to the compartment, the heating conduits in the second cluster having a second thickness, the second cluster of heating conduits being positioned vertically above the first cluster of heating conduits and spaced apart therefrom by a first separation distance, the first separation distance being at least as large as the smaller of the first and second thicknesses, the first separation distance defining a zone in the reaction vessel between the first cluster and second cluster that is configured to be conducive to good solids circulation;

introducing a fluidization medium into the compartment;

introducing carbonaceous material into the compartment in a region that is vertically between the first and second clusters of heating conduits; and controlling a reaction in the reaction vessel such that at least a portion of the carbonaceous material is converted into a product gas in a fluidized bed.

2. The method according to claim 1, comprising:

providing the reaction vessel with pulse heaters, the heating conduits being associated with the pulse heaters; and wherein:

controlling a reaction in the reaction vessel comprises controlling operation of pulse heaters.

3. The method according to claim 1, comprising operating the reaction vessel in a turbulent fluidization regime.

4. The method according to claim 3, wherein the fluidization medium is one from the group consisting of steam, air, enriched air, oxygen, nitrogen, carbon dioxide, recycle product gas, and mixtures thereof.

5. A method of thermochemically or biochemically processing a reactive material to form a product, the method comprising:

providing a fluid bed reactor comprising:

a reaction vessel defining a compartment suitable for receiving a reactive material;

a first cluster of heating conduits at least partially occupying said compartment and extending over a first vertical extent within the compartment, each heating conduit in the first cluster configured to transfer heat from a heat source to the compartment, the heating conduits in the first cluster having a first thickness; and a second cluster of heating conduits at least partially occupying said compartment and extending over a second vertical extent within the compartment, each heating conduit in the second cluster configured to transfer heat from a heat source to the compartment, the heating conduits in the second cluster having a second thickness, the second cluster of heating conduits being positioned vertically above the first cluster of heating conduits and spaced apart therefrom by a first separation distance, the first separation distance being at least as large as the smaller of the first and second thicknesses, the first separation distance defining a zone in the reaction vessel between the first cluster and second cluster that is configured to be conducive to good solids circulation;

introducing a fluidization medium into the compartment;

introducing reactive material into the compartment in a region that is vertically between the first and second clusters of heating conduits;

heating contents of the compartment via the heating conduits; and controlling a reaction in the reaction vessel such that at least a portion of the reactive material is converted into one or more products in a fluidized bed.

6. The method according to claim 5, comprising:

providing the reaction vessel with pulse heaters, the heating conduits being associated with the pulse heaters; and wherein:

controlling a reaction in the reaction vessel comprises controlling operation of pulse heaters.

7. The method according to claim 5, comprising operating the reaction vessel in a turbulent fluidization regime.

8. The method according to claim 7, wherein the fluidization medium is one from the group consisting of steam, air, enriched air, oxygen, nitrogen, carbon dioxide, recycle product gas, and mixtures thereof.

9. The method according to claim 1, wherein, in the fluid bed reactor, the first separation distance is at least as large as the smaller of the first and second vertical extents.

10. The method according to claim 9, wherein, in the fluid bed reactor, the first separation distance is at least twice as large as the smaller of the first and second vertical extents.

11. The method according to claim 5, wherein, in the fluid bed reactor, the first separation distance is at least as large as the smaller of the first and second vertical extents.

12. The method according to claim 11, wherein, in the fluid bed reactor, the first separation distance is at least twice as large as the smaller of the first and second vertical extents.

* * * * *